Nov. 8, 1960   I. C. SANDBACK ET AL   2,959,101
OPTICAL OBJECTIVE OF VARIABLE EQUIVALENT FOCAL LENGTH
Filed Sept. 20, 1957   2 Sheets-Sheet 1
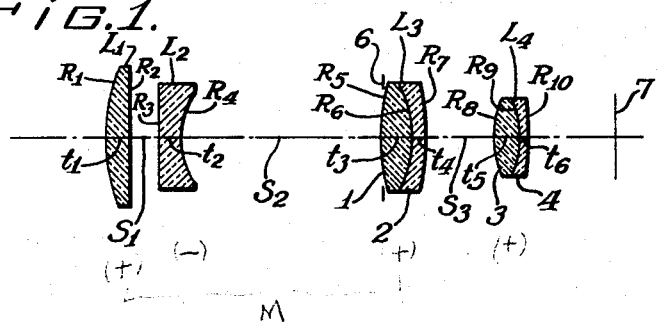
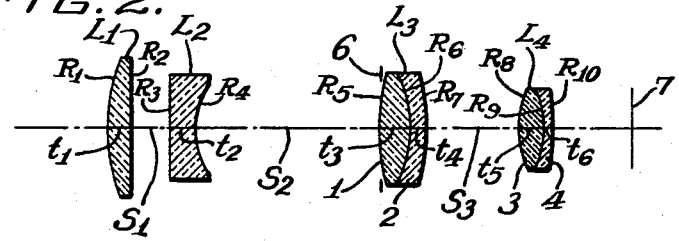
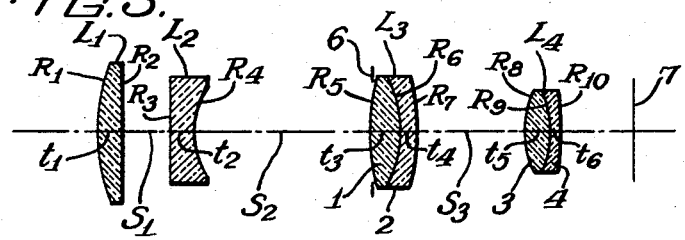
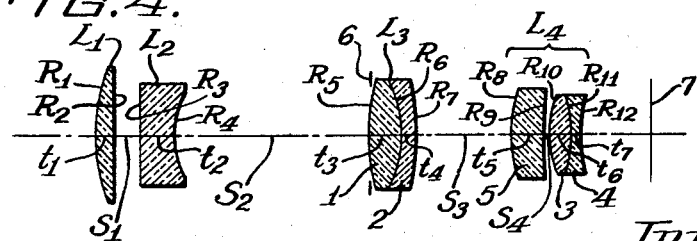
Inventors:
Irving C. Sandback
Arthur Cox
By Robert F. Michler Atty.

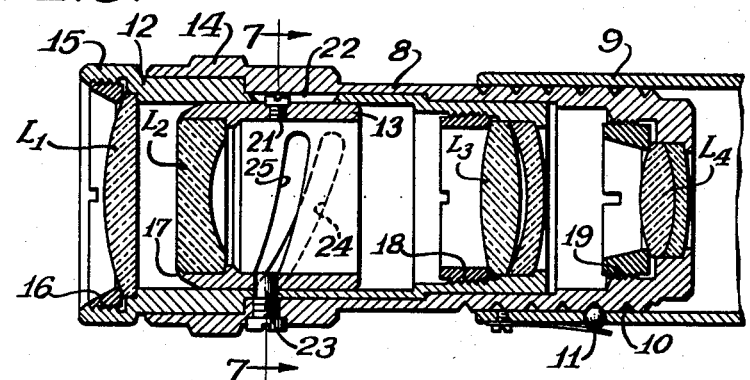
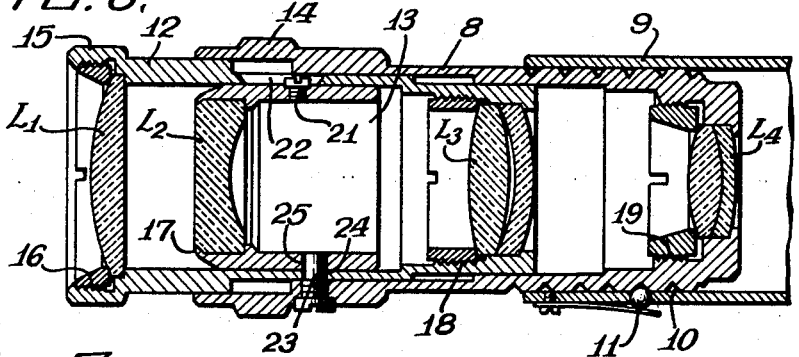
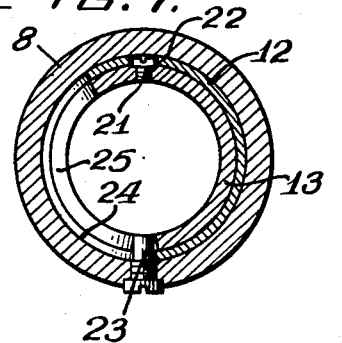
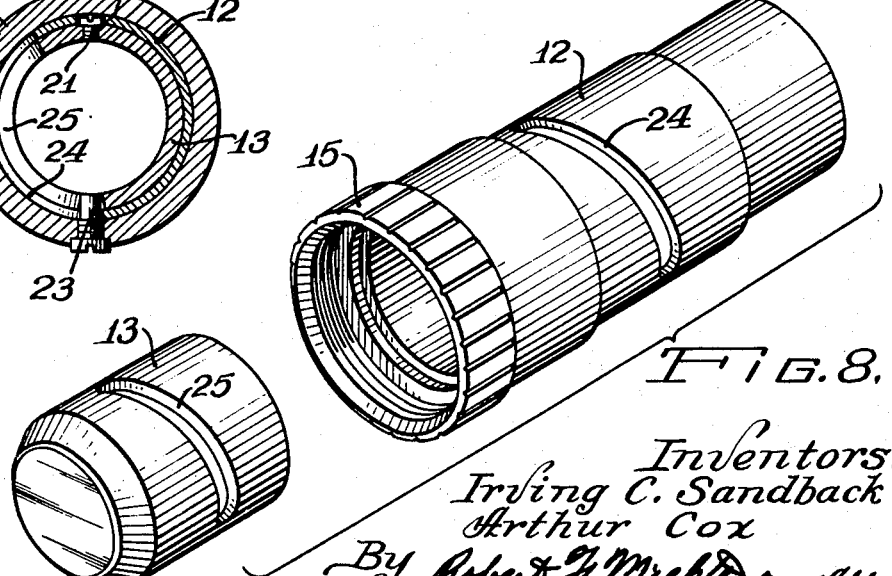

United States Patent Office 2,959,101
Patented Nov. 8, 1960

2,959,101
OPTICAL OBJECTIVE OF VARIABLE EQUIVALENT FOCAL LENGTH

Irving C. Sandback, Morton Grove, and Arthur Cox, Park Ridge, Ill., assignors to Bell & Howell Company, Chicago, Ill., a corporation of Illinois Filed Sept. 20, 1957, Ser. No. 685,200

8 Claims. (Cl. 88—57)

The invention relates to optical objectives of variable equivalent focal length, which, though instantly intended for projection purposes, is applicable to general photographic use as well.

The invention embodies the basic design of the objective disclosed and claimed in the copending United States patent application of Irving C. Sandback, Serial No. 685,163, filed September 20, 1957, now Patent No. 2,933,018, for improvement in Optical Objective, and assigned to the assignee hereof, and has for its objects the provision of an objective of variable equivalent focal length which is corrected for spherical and chromatic aberration, coma, astigmatism, field curvature and distortion, which maintains substantially uniform correction throughout an adequate range of variation of equivalent focal length, and which has a relatively large usable angular field without increasing the overall complexity of the optical system, while still maintaining a relatively high aperture and adequate clearance space between the rearmost component and the image or focal plane of the objective.

It is to be understood that the terms "front" and "rear" as herein used refer to the ends of the objective respectively nearer the long and short conjugates thereof.

In the accompanying drawings forming a part hereof;

Figures 1 to 3 illustrate the objective of Example 1 described herein and embodying the invention, and respectively show the objective in the short, nominal or intermediate, and long range variable equivalent focal length adjustments thereof;

Figure 4 illustrates the objective of Example 2 described herein, which is another embodiment of the invention;

Figures 5 and 6 are axial sectional views of an objective embodying the invention which is installed in a mounting providing adjustment of the components of the objective as hereinafter described, these views showing the components in different positions of adjustment;

Figure 7 is a sectional view taken on the line 7—7 of Figure 5; and

Figure 8 is an exploded perspective view of two of the objective component carrying parts of the objective mount, hereinafter described.

Referring to Figures 1 to 4, each of the objectives comprises four relatively air spaced components of which, beginning with the front of the objectives, the first component, designated at $L_1$, is positive, the second component designated at $L_2$, is relatively strongly negative, and the third and fourth components, respectively, designated at $L_3$ and $L_4$, are positive and comprise achromatized doublets, and the fourth component of Figure 4 additionally comprises an ancillary positive component closely spaced in front of the doublet thereof. The front and rear elements of the doublet $L_3$ are respectively designated at 1 and 2 in Figures 1 to 4, the front and rear elements of the doublet of $L_4$ are respectively designated at 3 and 4 in Figures 1 to 4, and the ancillary positive component of $L_4$ in Figure 4 is designated at 5.

Beginning with the front end of each objective $R_1$, $R_2$, etc. respectively designate the optical surfaces of the lens elements, $t_1$, $t_2$, etc. the axial thicknesses, $s_1$, $s_2$, etc. the axial separations of the components or lens elements, 6 designates the aperture stop of the objective which is disposed at the front of the third component, and 7 designates the image or focal plane.

Variance of the equivalent focal length of the objective is attained by axially adjusting the first and third components $L_1$ and $L_3$ in fixed relation with reference to the second and fourth components $L_2$ and $L_4$, axially adjusting the second component $L_2$ with reference to the first, third and fourth components $L_1$, $L_3$ and $L_4$ at a predetermined velocity ratio to said adjustment of the first and third components, and adjusting the objective as a unit with reference to the fixed image or focal plane 7 to compensate for a slight variance of the back focal length of the objective as its equivalent focal length is varied, as hereinafter more fully described.

The herein Examples 1 and 2 of the invention respectively conform with the following tables in which dimensions are in terms of inches, and in which the indices of refraction for the D line and the Abbe dispersion numbers are respectively designated at $n_d$ and $v$:

Example 1

[Equivalent focal length .857, 1.000, 1.114. Back focal length .6754, .6226, .5787. Aperture f/1.6]

| | | | | |
|---|---|---|---|---|
| $L_1$ | $R_1 = +1.449$ | $t_1 = .1800$ | $n_d = 1.651$ | $v = 55.8$ |
| | $R_2 = +23.85$ | $s_1 \begin{cases} =.2128 \\ =.3070 \\ =.3713 \end{cases}$ | | |
| $L_2$ | $R_3 = -45.58$ | $t_2 = .1800$ | $n_d = 1.5704$ | $v = 48.1$ |
| | $R_4 = +.6354$ | $s_2 \begin{cases} =1.5293 \\ =1.4351 \\ =1.3708 \end{cases}$ | | |
| $L_3$ | $R_5 = +1.6736$ | $t_3 = .2456$ | $n_d = 1.617$ | $v = 55.0$ |
| | $R_6 = -.8232$ | $t_4 = .0985$ | $n_d = 1.720$ | $v = 29.2$ |
| | $R_7 = -1.6736$ | $s_3 \begin{cases} =.5256 \\ =.7140 \\ =.8426 \end{cases}$ | | |
| $L_4$ | $R_8 = +.7568$ | $t_5 = .2042$ | $n_d = 1.517$ | $v = 64.5$ |
| | $R_9 = -.7568$ | $t_6 = .0614$ | $n_d = 1.720$ | $v = 29.2$ |
| | $R_{10} = -3.513$ | | | |

Example 2

[Equivalent focal length .7811, 1.000, 1.251. Back focal length .5951, .5425, .4617. Aperture f/1.4]

| | | | | |
|---|---|---|---|---|
| $L_1$ | $R_1 = +1.4501$ | $t_1 = .121$ | $n_d = 1.620$ | $v = 60.0$ |
| | $R_2 = $ Plano | $s_1 \begin{cases} =.016 \\ =.216 \\ =.396 \end{cases}$ | | |
| $L_2$ | $R_3 = $ Plano | $t_2 = .259$ | $n_d = 1.620$ | $v = 60.0$ |
| | $R_4 = +.6020$ | $s_2 \begin{cases} =1.714 \\ =1.514 \\ =1.414 \end{cases}$ | | |
| $L_3$ | $R_5 = +1.600$ | $t_3 = .259$ | $n_d = 1.617$ | $v = 55.0$ |
| | $R_6 = -.9091$ | $t_4 = .104$ | $n_d = 1.720$ | $v = 29.2$ |
| | $R_7 = -2.102$ | $s_3 \begin{cases} =.5536 \\ =.7536 \\ =.9536 \end{cases}$ | | |
| $L_4$ | $R_8 = +1.569$ | $t_5 = .259$ | $n_d = 1.620$ | $v = 60.0$ |
| | $R_9 = +10.50$ | $s_4 = .0065$ | | |
| | $R_{10} = +.7744$ | $t_6 = .173$ | $n_d = 1.589$ | $v = 61.0$ |
| | $R_{11} = -1.026$ | $t_7 = .065$ | $n_d = 1.720$ | $v = 29.2$ |
| | $R_{12} = +1.561$ | | | |

It will be observed that the objective has a relatively long back focal length, and the objective has the following characteristics:

The distribution of power over the components complies with $$+2.5\ F < -f_{(L_1+L_2)} < +4.0\ F$$
$$1.1\ F < f_2 < 2.1\ F$$
$$1.2\ F < f_3 < 2.3\ F$$

the separations of said second, third and fourth components $L_2$, $L_3$ and $L_4$ comply with $$.8\ F < s_2 < 2.0\ F$$
$$.6\ F < s_3 < 1.0\ F$$

where $f_{(L_1+L_2)}$ is the combined focal length of said first and second components $L_1$ and $L_2$, $f_2$ and $f_3$ are the focal lengths respectively of said third and fourth components $L_3$ and $L_4$, and F is the mean equivalent focal length of the objective intermediate the short and long equivalent focal lengths thereof, said first and second components $L_1$ and $L_2$ comply with $$.4 < \frac{R_4}{R_1} < .6$$

said positive third component $L_3$ complies with $$.7 < \frac{R_5}{-R_7} < 2.0$$

and the variation of the separations of the components of Example 1 are adjusted approximately in accordance with $$\pm \Delta s_1 = \mp \Delta s_2 = \pm .5 \Delta s_3$$

and said fourth component $L_4$ complies with $$-.5 < \frac{R_8}{R_{10}} < +1.5$$

The invention, as embodied in Example 1, has the following additional characteristics in that said first, second, third and fourth components, wherein the radii indicated both numerically increase and decrease simultaneously within the limitations of the following inequalities:

$$.8\ F < R_1 < 2.0\ F$$
$$.4\ F < R_4 < .9\ F$$
$$1.5\ F < R_5 < 2.7\ F$$
$$+1.0\ F < -R_7 < +2.5\ F$$
$$.6\ F < R_8 < 1.5\ F$$
$$-4.2\ F < R_{10} < +2.9\ F$$

and said fourth component $L_4$ complies with $$-.5 < \frac{R_8}{R_{10}} < +1.5$$

The general aberration correction of the objective is centered about the mean equivalent focal length adjustment thereof, as disclosed in said copending patent application, and by altering the separations of the components approximately in accordance with the above ratio, a variation of the equivalent focal length up to ±20% or ±30% may be attained without seriously disturbing the general aberration correction.

By altering the preferred ratio of the separation adjustment of the components expressed in the equation, $\pm \Delta s_1 = \mp \Delta s_2 = \pm .5 \Delta s_3$, certain changes in the aberration correction of the objective of Example 1 may be made. In order to change the coma correction to coincide exactly with the nominal corrected aberration pattern, in the objective of Example 1, the ratio of $\Delta s_1$ over $\Delta s_2$ is increased up to 2.0 for the long range adjustment, thereby introducing some undercorrect astigmatism which becomes tolerable at the longer focal length range due to the smaller angle of view required. In a similar manner the short range focal length adjustment is altered to provide a more satisfactory balance of coma and astigmatism at the expense of a slight undercorrected spherical aberration, by reducing the ratio of $\Delta s_3$ over $\Delta s_2$.

These changes in the direct separation ratios of the components enable the focal length range adjustment to be extended over that allowable by separation adjustment of the components in accordance with the above equation, and to permit this extended adjustment range the component separations must lie within the limits which apply to both the objective of Example 1 and that of Example 2.

$$.5 < \frac{\Delta s_1}{\Delta s_2} < 2.5$$

$$.5 < \frac{\Delta s_3}{\Delta s_2} < 2.5$$

The back focal distance of the objective varies slightly in a non linear manner as the equivalent focal length is varied, and this defocusing is corrected by adjusting the objective as a unit with reference to the image or focal plane 7.

Where the objective is used as a projection lens, the focusing adjustment of the objective may be made independently of focal length adjustment, the focal length of the objective being first adjusted until the proper magnification is obtained to conform with the projection screen distance and size and the objective then being adjusted to bring the projected image into sharp focus.

Where the objective is used as a photographic lens, the focal length and focusing adjustments of the objective are coupled together as is usual to maintain the image in sharp focus throughout the focal length adjustment range.

Referring to Example 2, the ancillary positive component 5 of the fourth component $L_4$ closely spaced in front of the doublet 3—4 thereof, substantially reduces the higher order spherical aberration, thereby enabling the relative aperture to be increased with respect to that of Example 1, and it is within the scope of the invention to compound one or more of the other components for better correction of the higher order aberrations or to secure a better stability of the chromatic corrections over the range of variation of the equivalent focal length.

Referring to Figures 5 to 8, the objective, as exemplified by Example 1, is shown as mounted for use as a projection lens, the focal length adjustment of the objective being independent of the focusing adjustment thereof.

An outer cylindrical sleeve 8 has its rear portion rotatably and slidably engaged in a bored hub 9 of a picture projector, and as usual is provided with an external helical groove 10 which is engaged by a spring pressed ball device 11 to conveniently provide longitudinal adjustment of the sleeve 8 with respect to the hub by rotation of the sleeve, this arrangement providing for the mounting and dismounting of the sleeve with respect to the hub.

An intermediate cylindrical sleeve 12 is slidably and rotatably engaged in the bore of the sleeve 8 forwardly of the rear portion of the latter, and a relatively short cylindrical sleeve 13 is slidably and rotatably engaged in the intermediate portion of the bore of the sleeve 12. The forward portion of the sleeve 8 which is disposed forwardly of the hub 9 is provided with an enlarged fluted portion 14 for conveniently manipulating this sleeve, and the intermediate sleeve 12 projects forwardly of the sleeve 8 and has an enlarged fluted portion 15 at its forward end for conveniently manipulating this sleeve.

The components of the objective of the invention are mounted in axial alinement within the sleeves 8, 12 and 13, the component $L_1$ being mounted within the forward end of the sleeve 12, as designated at 16, the component $L_2$ being mounted within the forward end of the sleeve 13, as designated at 17, the component $L_3$ being mounted within the rearward end of the sleeve 12, as designated at 18, and the component L₄ being mounted within the rearward end of the sleeve 8, as designated at 19. As so mounted the components L₁ and L₃ are mounted in fixed relation and are axially adjustable with respect to the components L₂ and L₄, and the components L₂ and L₄ are axially adjustable with respect to each other and with respect to the components L₁ and L₃.

A guide stud 21 is screwthreadedly secured on the sleeve 13 and projecting outwardly therefrom, is slidably engaged in a longitudinal slot 22 in the sleeve 12, so that these sleeves are rotatably fixed and longitudinally adjustable with respect to one another, and a guide stud 23 is screwthreadedly secured on the sleeve 8, and projecting inwardly therefrom, is slidably engaged in helical slots 24 and 25 respectively in the sleeves 12 and 13, these slots being of different inclinations as best shown in Figure 5.

Consequently, rotation of the sleeve 12 with respect to the sleeve 8, simultaneously effects longitudinal adjustments of the sleeves 12 and 13 with respect to the sleeve 8 and longitudinal adjustment of the sleeve 13 with respect to the sleeve 12 at different velocities dependent upon the different inclinations of the slots 24 and 25, and the components of the objective, mounted on the sleeves as above described, are correspondingly relatively axially adjusted.

The inclinations of the slots 24 and 25 are such that the components of the objective are relatively adjusted in correspondence with the ratio of the separation adjustment expressed in the aforesaid equation or as this equation is altered as above described, the focusing adjustment of the objective as a unit being effected by rotating the sleeve 8 to longitudinally adjust the objective with respect to the image or focal plane of the projector.

Since different embodiments of the invention can be made without departing from the spirit and scope thereof, it is intended that all matter shown in the accompanying drawing and described hereinabove shall be interpreted as illustrative and not in a limiting sense.

What is claimed as new is:

1. An optical objective of variable equivalent focal length comprising four air spaced components of which, beginning at the front end of the objective, the first component is positive, the second component is negative, and the third and fourth components are positive and comprise achromatized doublets, and further characterized in that the distribution of power over said components complies with $$+2.5\ F < -f_{(L_1+L_2)} < +4.0\ F$$
$$1.1\ F < f_2 < 2.1\ F$$
$$1.2\ F < f_3 < 2.3\ F$$

the separations of said second, third and fourth components complies with $$.8\ F < s_2 < 2.0\ F$$
$$.6\ F < s_3 < 1.0\ F$$

said first and second components comply with $$.4 < \frac{R_4}{R_1} < .6$$

and said third component complies with $$.7 < \frac{R_5}{R_7} < 2.0$$

and means for moving the first and third components as a unit and at a predetermined rate relative to the fourth component and the second component relative to the fourth component in the same direction as that of the first and third components but at a lesser rate than said predetermined rate, the component separations being within the limits $$.5 < \frac{\Delta s_1}{\Delta s_2} < 2.5$$

$$.5 < \frac{\Delta s_3}{\Delta s_2} < 2.5$$

where $f_{(L_1+L_2)}$ is the combined focal length of said first and second components, $f_2$ and $f_3$ are the focal lengths respectively of said third and fourth components, F is the mean equivalent focal length of the objective, $s_1$, $s_2$ and $s_3$ are the separations respectively of said first and second components, said second and third components, and said third and fourth components, $R_1$ and $R_4$ are respectively the radii of the front surface of said first component and of the rear surface of said second component and $R_5$ and $R_7$ are respectively the radii of the front and rear surfaces of said third component.

2. An optical objective of variable equivalent focal length as defined in claim 1 and further characterized in that said fourth component additionally comprises an ancillary positive component closely spaced in front of the doublet thereof.

3. An optical objective of variable equivalent focal length comprising four air spaced components of which, beginning at the front end of the objective, the first component is positive, the second component is negative, and the third and fourth components are positive and comprise achromatized doublets, and further characterized in that the distribution of power over said components complies with $$+2.5\ F < -f_{(L_1+L_2)} < +4.0\ F$$
$$1.1\ F < f_2 < 2.1\ F$$
$$1.2\ F < f_3 < 2.3\ F$$

the separations of said second, third and fourth components complies with $$.8\ F < s_2 < 2.0\ F$$
$$.6\ F < s_3 < 1.0\ F$$

said first and second components comply with $$.4 < \frac{R_4}{R_1} < .6$$

and said third component complies with $$.7 < \frac{R_5}{R_7} < 2.0$$

and means for varying the separations of said components approximately in accordance with the equation $$\pm \Delta s_1 = \mp \Delta s_2 = \pm .5 \Delta s_3$$

where $f_{(L_1+L_2)}$ is the combined focal length of said first and second components, $f_2$ and $f_3$ are the focal lengths respectively of said third and fourth components, F is the mean equivalent focal length of the objective, $s_1$, $s_2$ and $s_3$ are the separations respectively of said first and second components, said second and third components, and said third and fourth components, $R_1$ and $R_4$ are respectively the radii of the front surface of said first component and of the rear surface of said second component and $R_5$ and $R_7$ are respectively the radii of the front and rear surfaces of said third component.

4. An optical objective of variable equivalent focal length as defined in claim 3 and further characterized in that the separation adjustment ratio of said components as expressed in said equation is altered by increasing the ratio of $\Delta s_1$ over $\Delta s_2$ and decreasing the ratio of $\Delta s_3$ over $\Delta s_2$ within the limits of $$.5 < \frac{\Delta s_1}{\Delta s_2} < 2.5$$

$$.5 < \frac{\Delta s_3}{\Delta s_2} < 2.5$$

5. An optical objective of variable equivalent focal length as defined in claim 3 and further characterized in that said first, second, third and fourth components comply with and the radii indicated both numerically increase and decrease simultaneously within the following inequalities:

.8 $F<R_1<2.0$ $F$
.4 $F<R_4<.9$ $F$
1.5 $F<R_5<2.7$ $F$
+1.0 $F<-R_7<+2.5$ $F$
.6 $F<R_8<1.5$ $F$
−4.2 $F<R_{10}<+2.9$ $F$ and said fourth component complies with $$-.5 < \frac{R_8}{R_{10}} < +1.5$$

where $R_1$ is the radius of the front surface of said first component, $R_4$ is the radius of the rear surface of said second component, $R_5$ and $R_7$ are the radii respectively of the front and rear surfaces of said third component, and $R_8$ and $R_{10}$ are the radii respectively of the front and rear surfaces of said fourth component.

6. An optical objective of variable equivalent focal length as defined in claim 5 and further characterized in that the separation adjustment ratio of said components as expressed in said equation is altered by increasing the ratio of $\Delta s_1$ over $\Delta s_2$ and decreasing the ratio of $\Delta s_3$ over $\Delta s_2$ within the limits of $$.5 < \frac{\Delta s_1}{\Delta s_2} < 2.5$$

$$.5 < \frac{\Delta s_3}{\Delta s_2} < 2.5$$

7. An optical objective of variable equivalent focal length comprising four air spaced components of which, beginning with the front end of the objective, the first component is positive, the second component is negative, and the third and fourth components are positive and comprise achromatized doublets, and further characterized in that said objective complies substantially with the following table in which the dimensions are in terms of inches, and beginning with the front end of the objective $L_1$ to $L_4$ designate the components, $R_1$ to $R_{10}$ the radii of the surfaces, $t_1$ to $t_6$ the axial thicknesses, $s_1$ to $s_3$ the axial separations in the short, intermediate and long focal length adjustments of said components, $n_d$ the refractive indices for the D line, and $v$ the Abbe dispersion numbers:

| | | | | |
|---|---|---|---|---|
| $L_1$ | $\begin{cases} R_1 =+1.449 \\ R_2 =+23.85 \end{cases}$ | $t_1 =.1800$ | $n_d=1.651$ | $v=55.8$ |
| | $s_1\begin{cases}=.2128\\=.3070\\=.3713\end{cases}$ | | | |
| $L_2$ | $\begin{cases} R_3 =-45.58 \\ R_4 =+.6354 \end{cases}$ | $t_2 =.1800$ | $n_d=1.5704$ | $v=48.1$ |
| | $s_2\begin{cases}=1.5293\\=1.4351\\=1.3708\end{cases}$ | | | |
| $L_3$ | $\begin{cases} R_5 =+1.6736 \\ R_6 =-.8232 \\ R_7 =-1.6736 \end{cases}$ | $t_3 =.2456$ $t_4 =.0985$ | $n_d=1.617$ $n_d=1.720$ | $v=55.0$ $v=29.2$ |
| | $s_3\begin{cases}=.5256\\=.7140\\=.8426\end{cases}$ | | | |
| $L_4$ | $\begin{cases} R_8 =+.7568 \\ R_9 =-.7568 \\ R_{10}=-3.513 \end{cases}$ | $t_5 =.2042$ $t_6 =.0614$ | $n_d=1.517$ $n_d=1.720$ | $v=64.5$ $v=29.2$ |

8. An optical objective of variable equivalent focal length comprising four air spaced components of which, beginning with the front end of the objective, the first component is positive, the second component is negative, and the third and fourth components are positive and comprise achromatized doublets and the fourth component further comprises an ancillary positive component closely spaced in front of the doublet thereof, and further characterized in that said objective complies substantially with the following table in which the dimensions are in terms of inches, and beginning with the front end of the objective $L_1$ to $L_4$ designate the components, $R_1$ to $R_{12}$ the radii of the surfaces, $t_1$ to $t_7$ the axial thicknesses, $s_1$ to $s_4$ the axial separations in the short, intermediate and long focal length adjustments of the components, $n_d$ the refractive indices for the D line, and $v$ the Abbe dispersion numbers:

| | | | | |
|---|---|---|---|---|
| $L_1$ | $\begin{cases} R_1 =+1.4501 \\ R_2 =\text{Plano} \end{cases}$ | $t_1 =.121$ | $n_d=1.620$ | $v=60.0$ |
| | $s_1\begin{cases}=.016\\=.216\\=.396\end{cases}$ | | | |
| $L_2$ | $\begin{cases} R_3 =\text{Plano} \\ R_4 =+.6920 \end{cases}$ | $t_2 =.259$ | $n_d=1.620$ | $v=60.0$ |
| | $s_2\begin{cases}=1.714\\=1.514\\=1.414\end{cases}$ | | | |
| $L_3$ | $\begin{cases} R_5 =+1.600 \\ R_6 =-.9091 \\ R_7 =-2.102 \end{cases}$ | $t_3 =.259$ $t_4 =.104$ | $n_d=1.617$ $n_d=1.720$ | $v=55.0$ $v=29.2$ |
| | $s_3\begin{cases}=.5536\\=.7536\\=.9536\end{cases}$ | | | |
| $L_4$ | $\begin{cases} R_8 =+1.569 \\ R_9 =+10.50 \\ R_{10}=+.7744 \\ R_{11}=-1.026 \\ R_{12}=+1.561 \end{cases}$ | $t_5 =.259$ $s_4 =.0065$ $t_6 =.173$ $t_7 =.065$ | $n_d=1.620$ $n_d=1.589$ $n_d=1.720$ | $v=60.0$ $v=61.0$ $v=29.2$ |

References Cited in the file of this patent
UNITED STATES PATENTS 2,732,763     Back et al. _____ Jan. 31, 1956

FOREIGN PATENTS 1,120,271     France _____ Apr. 16, 1956
1,123,471     France _____ June 11, 1956
  440,397     Great Britain _____ Sept. 26, 1934